United States Patent [19]
Townsend et al.

[11] Patent Number: 5,361,712
[45] Date of Patent: Nov. 8, 1994

[54] CULTIVATING APPARATUS FOR LEVELING, CULTIVATING, AND RESOWING LAWNS OR FIELDS

[75] Inventors: Bruce R. Townsend, 111a New Windsor Road, Avondale, Auckland 7; Derek R. Bird, Avondale; Norman C. Goldsack, Onehunga, all of New Zealand

[73] Assignee: Bruce Robert Townsend, Auckland, New Zealand

[21] Appl. No.: 940,661

[22] Filed: Sep. 4, 1992

[30] Foreign Application Priority Data

Sep. 16, 1991 [NZ] New Zealand ............... 239821

[51] Int. Cl.⁵ ............................................ A01C 5/06
[52] U.S. Cl. ...................................... 111/168; 111/154; 111/63; 111/68; 111/69; 172/599; 172/736
[58] Field of Search ............ 111/168, 154, 63, 50, 111/68, 69, 163; 172/736, 599; 222/561

[56] References Cited

U.S. PATENT DOCUMENTS

| | | | |
|---|---|---|---|
| 1,829,745 | 11/1931 | Grossi | 111/154 |
| 2,042,133 | 5/1936 | Underwood | 111/168 X |
| 2,818,008 | 12/1957 | Fulper et al. | 172/599 X |
| 4,265,186 | 5/1981 | Nichols | 111/154 X |
| 4,475,672 | 10/1984 | Whitehead | 222/561 |
| 4,766,962 | 8/1988 | Frase | 172/736 X |

FOREIGN PATENT DOCUMENTS 2222756  3/1990  United Kingdom ............... 111/163

Primary Examiner—Randolph A. Reese
Assistant Examiner—Christopher J. Novosad
Attorney, Agent, or Firm—Ladas & Parry

[57] ABSTRACT

Cultivating apparatus for leveling, cultivating, and re-sowing lawns or fields. The cultivating apparatus includes: a row of ripping tines arrayed across the front of the apparatus, which are arranged to freely pivot forward and upward in use, to release clogged soil or other material by reversing, when necessary. A levelling plate is provided immediately behind the tines. An adjustment system is provided for an elongated horizontal rack of cultivating discs, by which the rack may be raised and lowered accurately and evenly at both ends, so as to maintain a correct, horizontal orientation. A corresponding adjustment system on an array of outlets from an elongated seedbox allows all the outlets to be opened or closed equally. The apparatus also includes pivotable seed dispensing spouts, a tilted mounting arrangement of the cultivating discs, which allows seed-dispensing spouts to be positioned over the widest part of cuts made by the discs, to drop seeds into the cuts in use, and a transverse roller at the rear of the apparatus behind the discs and seed outlets.

11 Claims, 6 Drawing Sheets

CULTIVATING APPARATUS FOR LEVELING, CULTIVATING, AND RESOWING LAWNS OR FIELDS

FIELD OF THE INVENTION

The present invention relates to agricultural apparatus, with particular application to lawn-cultivating apparatus.

BACKGROUND OF THE INVENTION

In its preferred form the present invention provides a towable lawn cultivator, particularly suited for use in leveling, cultivating and resowing lawns or fields. It is generally desirable when cultivating lawns or fields, particularly sports or playing fields or golf courses, that the ground be made as level as possible and that the distribution of grass or other lawn vegetation be as even as possible. For this reason, and for smoothness of operation, it is desirable that the various parts of the cultivating apparatus be maintained as nearly parallel to the overall ground surface as possible at all times, to avoid creating ridges or furrows when making parallel runs over the field. Furthermore, it is desirable that the distribution of seed be substantially even across the width of sowing apparatus, to avoid creating strips or bands of different vegetation density. With particular regard to sports fields, but also lawns and fields where patches of weed have been poisoned, there is a need for apparatus to resow bare patches with minimal disturbance to existing vegetation.

OBJECT

It is an object of the present invention to go at least partway towards providing novel or improved agricultural apparatus, or at least to provide the public with a useful choice.

SUMMARY OF THE INVENTION

In one aspect the present invention provides apparatus adapted to work a ground surface as it moves across said surface, including a plurality of surface cutting rotatable discs mounted in a substantially horizontal array, extending transversely across a direction of travel of the apparatus, wherein said discs are mounted on an elongate rack by support members extending rearwardly and downwardly from said rack, to allow a clear space over and about a rearmost part of each said disc, whereby in use seeds can be poured through said apparatus onto said ground surface at or about the rearmost part of each said disc.

Preferably the discs are mounted on an elongate rack which can be raised or lowered relative to a support frame, and rotatable engagement elements link said rack to said support frame at or towards each end of said rack, and said elements are coactively connected so as to rotate at the same rate.

Preferably the rotatable engagement elements comprise gears mounted on said support frame, engaging shafts on said rack, said gears being operable by a common crankshaft.

In another aspect the present invention provides apparatus for working a ground surface, having ground working tools including rotatable discs mounted in paired arrays, each array of the pair being a substantial mirror image of the other; and wherein said discs are dished, with the concave face angled forwards in the direction of travel.

In another aspect the present invention provides apparatus for working a ground surface, including a seed hopper, extending at least partway across the width of the apparatus and having a plurality of outlets at intervals across the width of the apparatus, wherein a plurality of spouts are connected to said outlets with flexible ducts, and said spouts are mounted on a carriage which is movable relative to said rack.

In a further aspect the present invention provides apparatus adapted to work a surface as it is moved across said surface, including a row of tines extending horizontally across the apparatus, wherein said tines are pivotally mounted on a horizontal shaft, with barrier means to prevent pivotal movement of said tines backwards beyond a working orientation in use.

BRIEF DESCRIPTION OF THE DRAWINGS

The following is a description of a preferred form of the present invention, given by way of example only, with reference to the accompanying drawings, in which:

As shown in FIG. 1, the preferred apparatus 10 comprises a towable cultivator adapted for connection by a three-point linkage to a tractor or other towing vehicle. Preferably a "floating" three-point linkage is used, so that the cultivator stands level with the ground surface, independently of the towing vehicle. The cultivation apparatus is comprised of five general parts—a row of tines 50 at the front, followed by a horizontal transverse blade 51, an array of cultivating discs 11, seed dispensing apparatus 20, and a roller 40. The tines 50 act to break up the surface of the ground; the transverse horizontal blade 51 levels it; the discs 11 cut tilths or furrows into which seeds are dispensed; the roller 40 flattens the ground out and compacts it. It should be appreciated that the terms "horizontal" and "vertical" are used with reference to the apparatus when standing on a horizontal ground surface. When used on a slope, the "horizontal" blade 51 and other elements will naturally lie parallel to the ground surface of the slope, rather than the horizon. Similarly, elements referred to as "vertical" stand substantially orthogonally with respect to the ground surface, rather than the horizon.

As shown in FIG. 2, the discs 11 are mounted on horizontal axles 12, set at an angle (not quite orthogonal) to the direction of travel. Preferably the discs 11 are mounted in two substantially mirror-image arrays, substantially symmetrically arranged on either side of the centre line of the cultivator. The angles of the arrays relative to the direction of travel may either be fixed, or adjustable as required. Preferably each array is fastened to the apparatus by a pair of bolts 18, one of which is movable back and forth along a slot 19, to adjust the angle. Each disc 11 is slightly dished, and has a sharp rim 13 which contacts or nearly contacts a scraper 14, to clean any adhering matter from the sharp edge. The concave face of each disc 11 is directed outwardly and forwardly; the convex face is directed inwardly and rearwardly. As the apparatus is pulled forwards, the sharp edge of each disc rolls outwardly as it comes down to contact the ground, and naturally tends to cut into the ground as a consequence.

Figure 1:
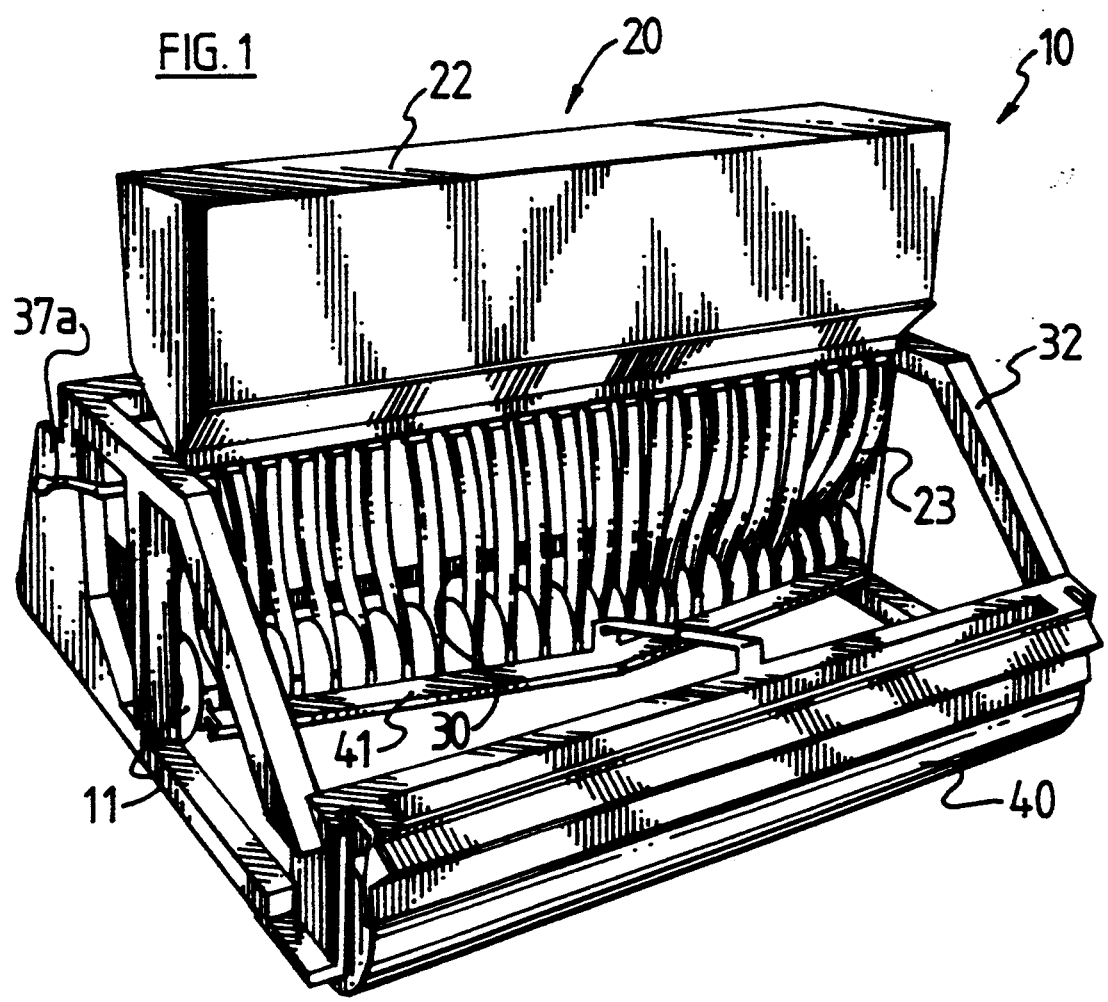
FIG. 1: shows the preferred apparatus in rear perspective view.

The axles 12 are mounted on bearings in a bearing housing 15. This in turn is bolted onto a mounting plate 16 set at approximately 45° to the horizontal, such that the axles 12 lie below and behind the mounting plate. This arrangement allows secure fastening of the array of discs 11 on the apparatus 10, while also allowing open vertical access to a point directly behind the axles 12. This allows seeds to be dispensed substantially vertically, either through spouts 21 or broadcast, at this point. The discs 11 make cuts or tilths in the ground as the apparatus 10 moves across a field, and it is at this point, directly behind and below the axles 12, that the cut is most widely opened. By dispensing the seeds vertically directly behind the axles 12, most or all can be dropped into the cut or filth, which subsequently closes or folds over them. By this means, the seeds are accurately and consistently planted at an appropriate depth, and are protected by the earth closing over them.

The angling of the array of discs across the direction of travel causes the discs to open out the cuts that they make in the ground, and also causes them to turn on the axles 12 as they are pulled along. Because the two arrays are at mirror-image angles, they each push against the other to some extent, which in conjunction with the dished form of each disc, assists them in pulling and digging into the ground, avoiding or reducing the need for weight in the apparatus to drive the tools into the ground. The relatively light weight of the apparatus makes it particularly suitable for use on golf courses or lawns in ornamental gardens, where large, heavy equipment may damage existing grounds. The cultivator 10 might be towed across a field at 2 to 5 mph, and 8 inch diameter discs might rotate at anything from 1 to 10 revolutions per second, depending not only on speed but also the consistency of the soil and such factors.

By cutting the ground surface, rather than digging or chipping at it, the present invention can be used on ground with patchy vegetation cover, to cultivate areas of bare ground without uprooting the patches of existing grass between. In bare areas, the cutting/lifting action of the discs act to break the surface into small pieces and tumble it. In areas with existing vegetation, the root structure holds the surface together between cuts made by the tines and discs, and the only effect of the apparatus is to score the ground with parallel cuts. The vegetation is not torn out or overturned and by sowing seed continuously over bare patches and patches of vegetation, the new plant growth is "knitted" into the existing vegetation along the parallel cuts, and blends smoothly. This apparatus is found to be particularly useful for resowing ground where weeds have been sprayed with herbicide. To some extent this effect is dependent on the size and spacing of the discs and tines—if they cut too deep or close together, the vegetation is likely to be uprooted and overturned, or mulched. If they cut too shallow or too far apart, the soil will not be effectively cultivated. For work on grass surfaces it is currently preferred to use discs 8 inches in diameter, with less than 4 inches, or more preferably 2 to 3 inches spacing between them.

Figure 2:
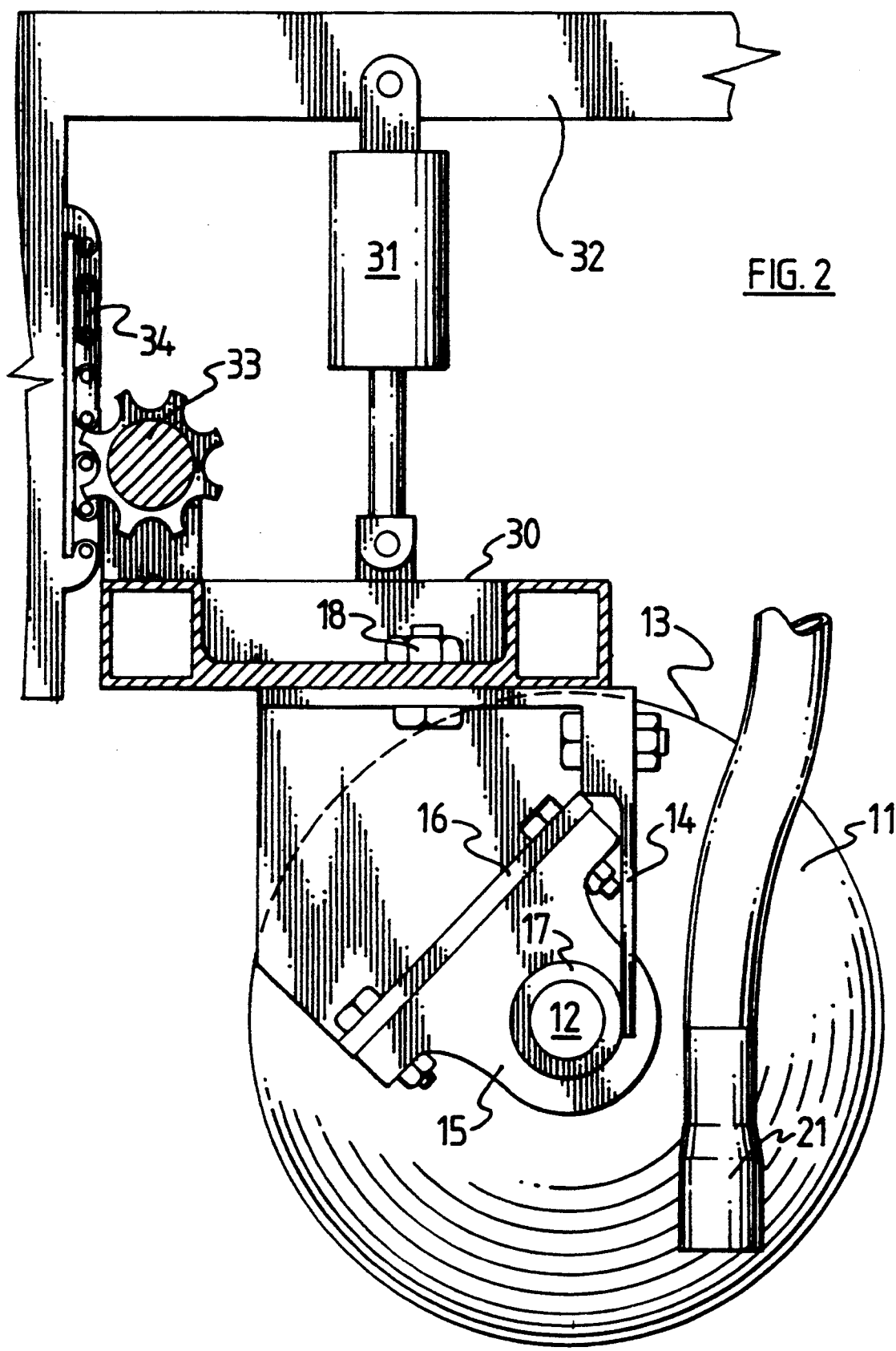
FIG. 2: illustrates the cultivating disc mounting and depth adjustment system in side view and cross section.
Figure 3:
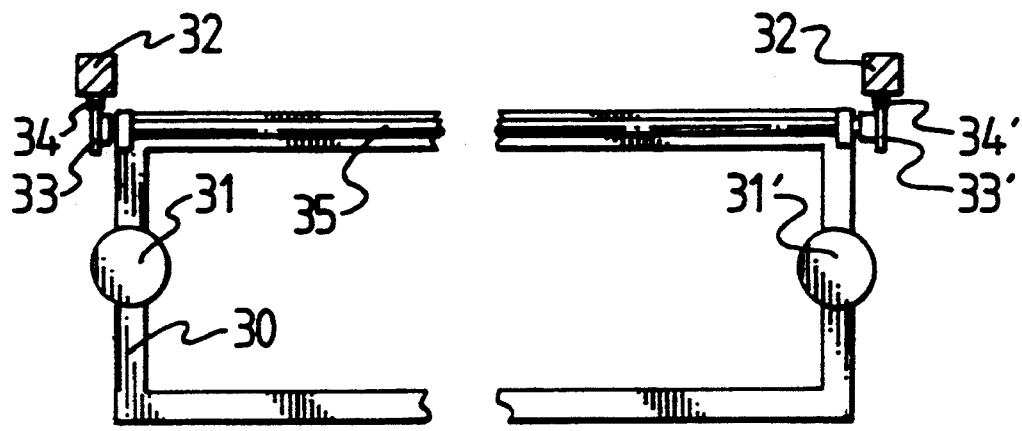
FIG. 3: illustrates the depth adjustment system in plan view.

The discs 11 are spaced apart on the axles 12 by collars 17, and can be removed for sharpening or replacement, by unbolting the bearing housing 15, and sliding them off the axle 12. The mounting plate 16, to which the bearing housing 15 is attached, is in turn mounted at approximately 45° under a horizontal rack 30 with bolts 18. The rack 30 is held on adjustable supports which allow it to be raised and lowered, so that the depth of the cuts or tilths made by the discs 11 can be adjusted to suit a particular purpose or conditions. The adjustable support mechanism may be hydraulically operated, as illustrated in FIG. 2 and FIG. 3, or may be manually operated as illustrated in FIG. 4 and FIG. 7.

The hydraulic raising and lowering apparatus includes a hydraulic cylinder or ram 31 mounted at one end of the rack 30 operating between the rack 30 and the frame 32 of the cultivator 10; a rotatable sprocket 33 mounted on the rack 30, and a chain 34 fixed on the frame 32, with which the sprocket 33 engages. As shown in FIG. 3, a second set of apparatus—a ram 31', sprocket 33', and chain 34'—are mounted at the other end of the rack 30, and the two sprockets 33 and 33' are fixed on a common axle 35. The axle 35 is rotatably mounted in bushes fixed to the frame 30. Because the two sprockets 33 and 33' are fixed together, they must rotate at the same rate, and this ensures that both ends of the rack 30 climb up or down the chains 34 and 34' at the same rate. The rack 30 consequently is retained in a substantially horizontal configuration as it is raised and lowered, despite any differences in pressure between the two rams 31 and 31'. The sprockets 33 and chains 34 also serve to inhibit fore/aft swinging of the rack 30 relative to the frame 32. It will be appreciated that further sprockets and chains might be included at the rear of the rack 30, as well as the front, although this is not seen as necessary at present.

Figure 4:
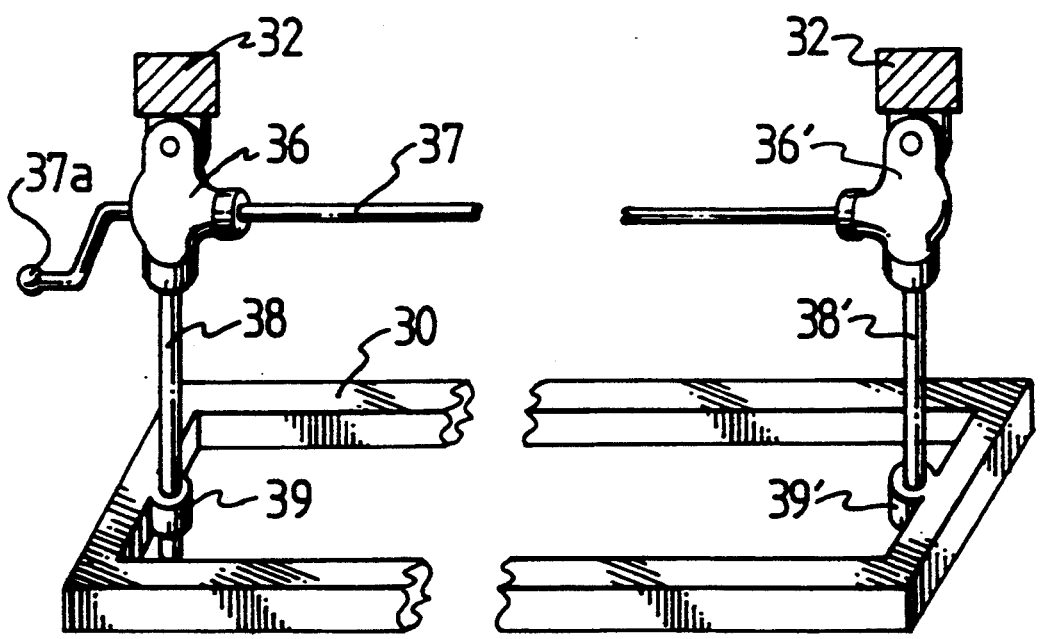
FIG. 4: illustrates an alternative depth adjustment system in rear view.
Figure 5:
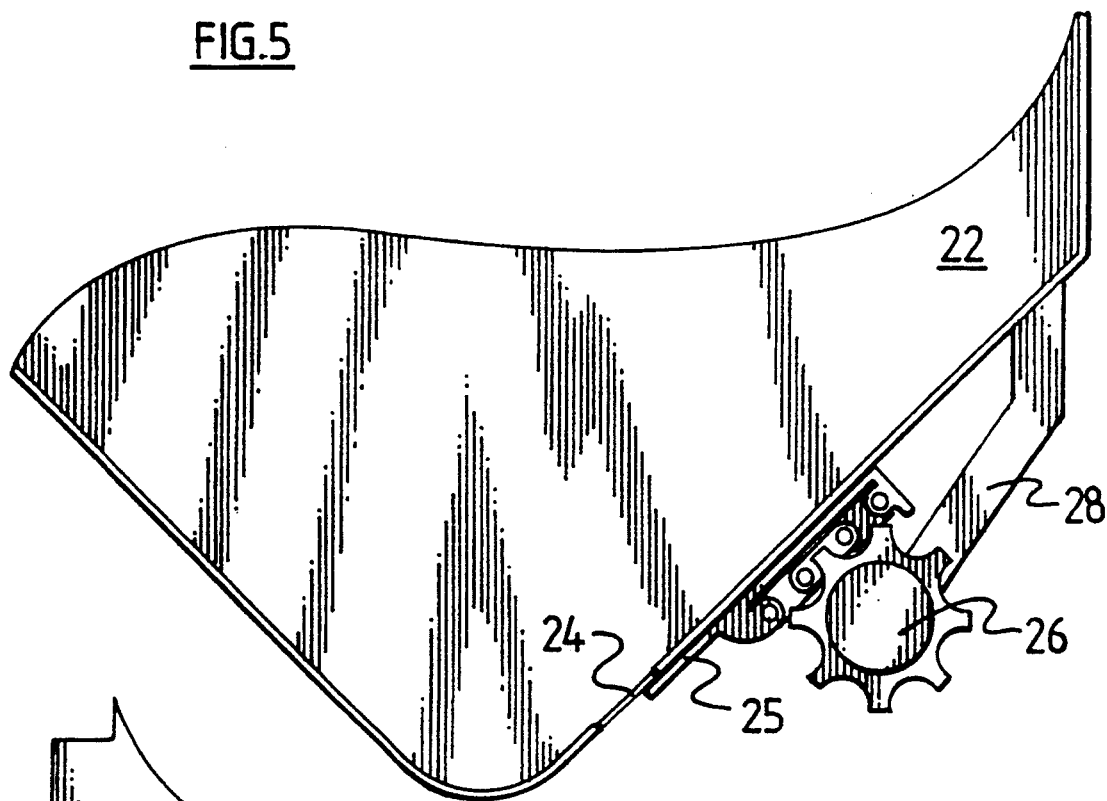
FIG. 5: illustrates the seedbox outlet adjustment system in side view.
Figure 6:
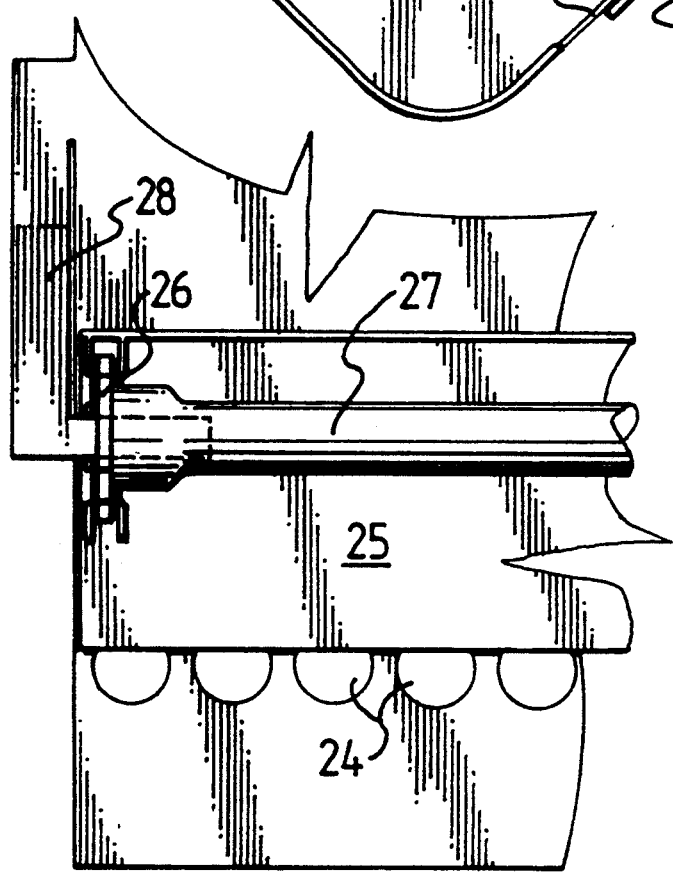
FIG. 6: illustrates the system of FIG. 5 in rear view.
Figure 7:
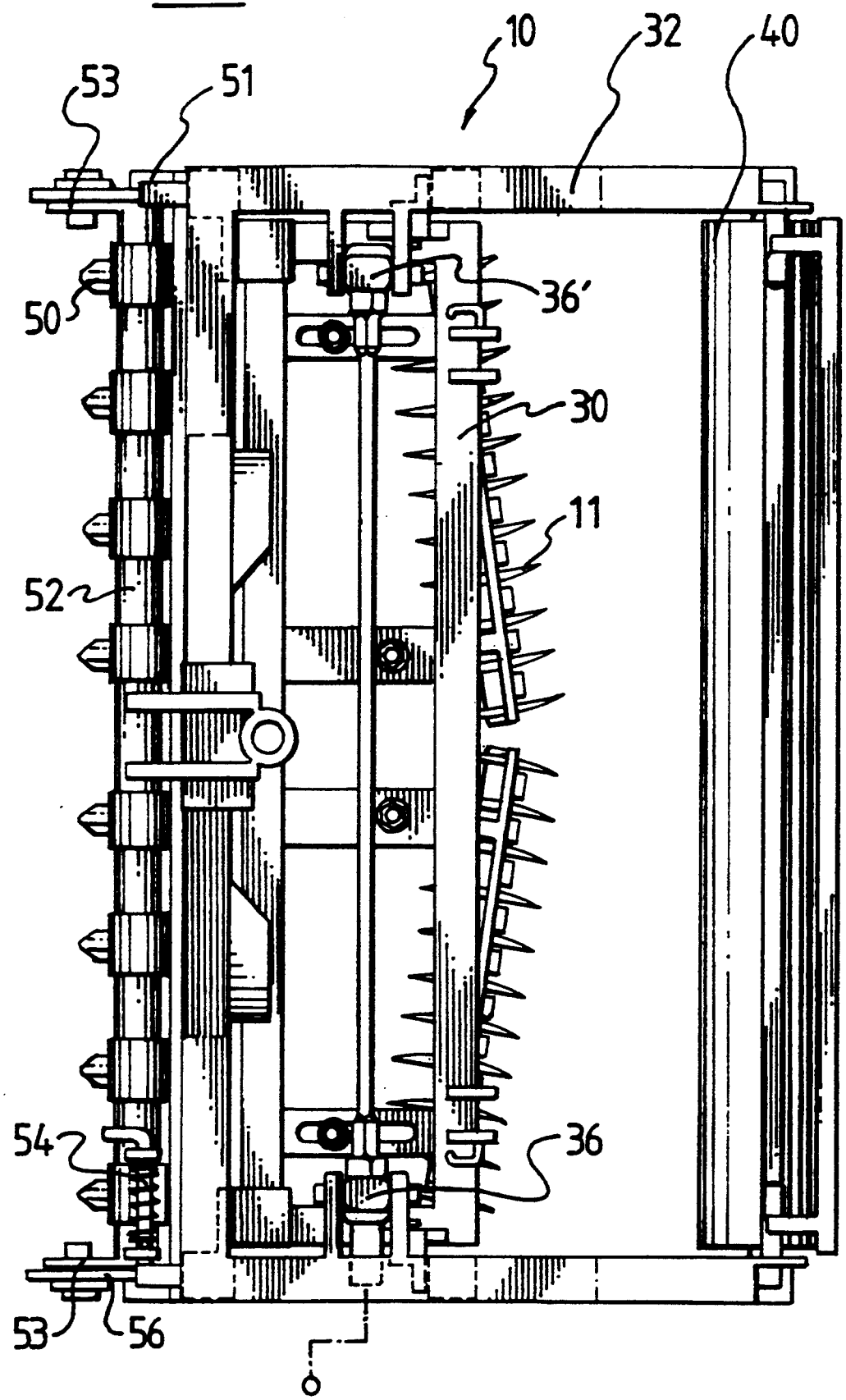
FIG. 7: shows apparatus incorporating the system of FIG. 4, in plan view, with the seed box removed.

As shown in FIGS. 4 and 7 the alternative, manually operated mechanism comprises a pair of right-angle gearboxes 36 and 36' mounted on the frame 32 over opposite ends of the rack 30, with a common horizontal crank shaft 37 operated by a crank handle 37a. By turning the handle, two vertical screw-threaded rods 38 and 38' are rotated at the same rate, one by each gearbox 36 and 36'. These rods pass through nuts 39 and 39' fixed to the rack 30. As the rods 38 and 38' are rotated, the nuts 39 and 39', and hence the rack 30, are pulled up or down at the same rate at each end.

Guides may be provided on the rack 30, running in slots or tracks provided on the frame 32, to prevent tipping and fore/aft movement of the rack relative to the frame.

Seeds can be distributed over the cultivated ground by either broadcast scattering over the surface as it is cultivated, or through spouts 21 directly into the cuts made by the array of discs 11. If the soil is bare and being sown for the first time, it is preferred to broadcast the seed, dropping it directly from a hopper or bin 22 over and around the arrays of discs. A skirt or cover may be provided between the two to prevent the wind from blowing seed away. When the apparatus is used on bare soil, the surface is broken up and tumbled by the discs 11, forming a continuous bed of fragmented, aerated soil. Because bare soil does not hold together in the same way as soil with plant cover, the surface is tumbled randomly, and seeds are mixed in with it regardless of how or where they are dropped. By contrast, when the apparatus is used on soil which is held together by vegetation, the discs act to cut and lift the soil, and then drop it in its original position and orientation. Broadcast seed accordingly tends to fall onto the blades of the existing grass cover, and a large proportion does not reach the soil. For this reason it is preferred to use spouts 21 when resowing lawns or playing fields, or working on patchy areas of vegetation, to deposit seed directly into the cuts made in the soil by the discs 11.

Seeds are dispensed to the spouts 21 by dispensing apparatus 20, which comprises a hopper or bin 22, and a row of outlet tubes 23, each leading substantially vertically downward from apertures 24, in the bin 22, to the spouts 21. It is preferred that the tubes 23 be vertical or nearly vertical, to reduce the likelihood of blockages, and flexible so that they can bend as the spouts 21 are raised or lowered. The spouts 21 are preferably mounted on a common pivotable carriage 41, which can be pivoted to lift the spouts out from between the discs 11 when seeds are not being dispensed. This avoids unnecessary risk of blockage when heavy cultivation is done with the apparatus 10 prior to sowing.

The bin 22 extends across substantially the whole width of the cultivator 10, and preferably has the general form of a trough, having a base line extending horizontally across the cultivator, with the outlet apertures 24 arranged in a row slightly above this base line. A horizontal impellor or conveyor may be provided in the bin 22 to shift the contents, and push them out through the outlet apertures 24. To adjust the rate of seed dispensed, the size of the apertures 24 may be increased or decreased, by the use of a sliding plate or door 25, extending across the whole row of apertures, and adjustable up or down. A pair of sprockets 26 and 26' are mounted over the door 25, one at each end, and are interconnected by a common shaft 27, to which they are fixed. The sprockets and shaft are rotatably mounted on the bin 22 with brackets 28. The sprockets engage with chains 29 fixed onto the door 25 at each end. Because the two sprockets are interconnected by the shaft 27 they must rotate at the same rate, and consequently the door 25 is opened or closed by the same amount at each end. This ensures that the same volume of seed is dispensed down each outlet tube 23, and consequently that substantially the same density of vegetation is sown by the cultivator 10 across its whole width. Furthermore, the door 25 is less inclined to jam. The door may be opened and closed manually, with a handle connected to the door itself, or to the sprockets 26 and 26', and shaft 27.

In some cases it may be desirable to broadcast seed rather than undersow it. In such cases the spouts 21 and outlet tubes 23 might be removed, and seed simply scattered directly from the bin 22 through the apertures 24, over the cultivated ground beneath.

Figure 8:
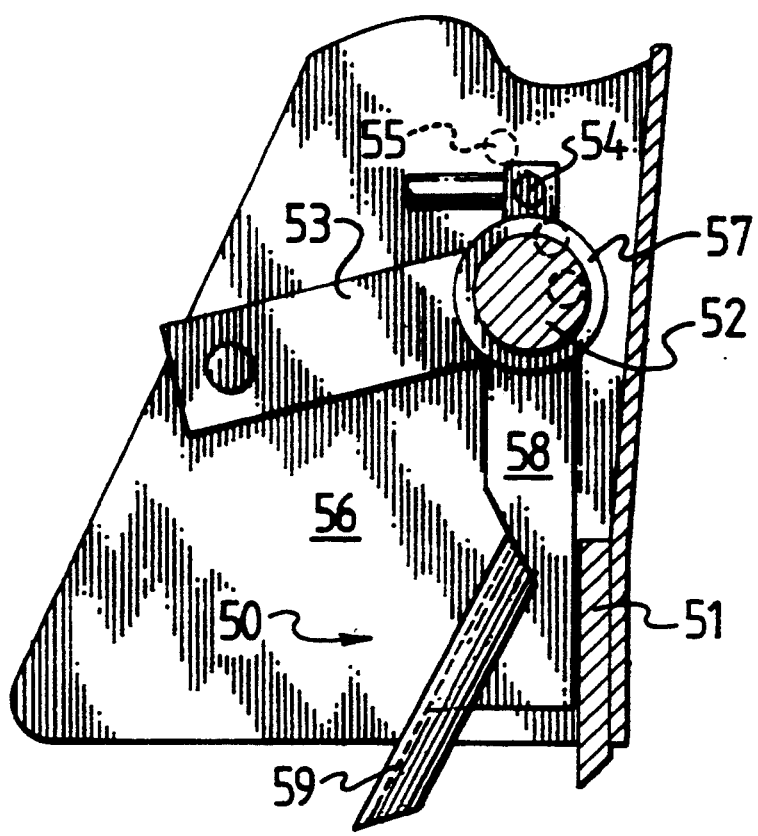
FIG. 8: illustrates a ripping line in side view.

The tipping tines 50, as shown in FIGS. 7 and 8, comprise an array of sharp blades across the front of the apparatus, which serve to help the discs 11 cultivate the ground by breaking up surface structures such as clods of clay, buffalo grass or roots, and thereby helping the discs to cut into the ground. The tines 50 are immediately followed by a transverse levelling plate 51, which levels the broken surface. As shown in FIG. 7, the tines 50 are mounted on a horizontal shaft 52 which is in turn mounted on pivot arms 53 at each end. The array of times can be pivoted up or down on the arms 53, and locked at any of a number of depth-settings with a spring pin 54, engaging in holes 55 in mounting support plates 56.

The plate 51 and support plates 56 form a "scoop" at the front of the apparatus, by which any large rocks or clods of soil and tumbled along in front of the apparatus. This serves to break up the clods, and also allows the rocks to be carried to the edge of an area being cultivated, where they can be left simply by lifting or reversing the apparatus. This serves to protect the discs to some extend. The support plates 56 prevent such rocks or rubbish from falling out the sides of the apparatus onto adjacent ground which has just been, or is about to be cultivated.

The tines 50 are preferably freely rotatable on the shaft 52. Each tine is comprised of a sleeve 57 on the shaft 52, a leg 58 projecting from the sleeve 57, and a blade 59 mounted on the leg 58. In use, as the apparatus 10 is dragged forward, the blade 59 will dig into the ground pushing the leg 58 back, into contact with the levelling plate 51 as shown in FIG. 8. The plate 51 prevents the tine 50 from pivoting further, and accordingly the blade 59 digs into and tips the ground surface as the apparatus is pulled forwards. If the tines 50 become clogged with soil or vegetation such that they can not dig effectively, or hold a "bow wave" of material in front of them, the apparatus 10 is stopped and pushed backwards. This causes the fines 50 to pivot up and out around the shaft 52 freely, dislodging the clogged material and breaking up any mass of material carried in front of them.

The blades 59 are preferably formed from V-section steel, fixed to the leg 58 with the point of the V facing forwards, and set at an angle so as to project forwards at the tip. The leg 58 is preferably cut from sheet metal, and welded to the sleeve 57.

The assembly can preferably be pivoted up and fastened at a height where the blades 59 are clear of the ground, so that they do not engage when the apparatus is being used for sowing rather than cultivating. A spring "suspension" might be incorporated into the assembly, or each individual tine, to allow some flexibility. This may help to avoid damage if a tine contacts an immovable object. Such provisions are not however considered necessary for the purposes of the illustrated example.

The tines 50 might also be removable, or be arranged to lift well clear of the ground, so that an additional roller or other apparatus can be fitted in their place for undersowing.

It will be appreciated that a wide variety of changes and modifications might be made to the apparatus within the general spirit and scope of the present invention. In particular, the various different parts of the invention, such as the rack raising and lowering mechanism, the disc mounting arrangement, the seed dispersing arrangement, and the seed outlet adjustment means, might each be used individually with apparatus otherwise as hitherto available, or in combination with one or more of the other invented features. Similarly, various features of the invention might be used individually or in combination on agricultural apparatus other than cultivators, such as mowers or planters, and possibly also on other equipment such as roadworking or construction equipment. The full combination of features as described above is however preferred at present, in that they co-operate to provide a better operation on a ground surface than if each piece of equipment were to be used individually. For example, the provision of the roller, the horizontal plate 51 and the arrays of discs 11 all on the same apparatus ensures that they are all parallel to each other and to the ground surface as they pass over the same point. The tines and plate serve to protect the discs from large rocks or rubbish, as well as performing their own ripping and levelling functions.

The particular dimensions and forms illustrated may be altered considerably to suit different equipment or purposes, and various other modifications might also be made within the scope of this invention, which may be characterised by the following claims:

I claim:

1. Apparatus for levelling, cultivating, and resowing lawns or fields as it moves across a ground surface, comprising:
   a support frame;
   a row of tines mounted at or near the front of the support frame, and a substantially vertical, transverse plate positioned behind said row of tines, having a substantially horizontal lower edge contacting said ground surface in use, said tines being pivotally mounted on a horizontal shaft, and said shaft being mounted close to said transverse plate so that said transverse plate acts as a barrier to prevent pivotal movement of said tines backwards beyond a working orientation in use;
   an elongated rack mounted in said support frame;
   a plurality of surface cutting rotatable discs mounted in a substantially horizontal array, extending generally transversely across a direction of travel of the apparatus, each disc arranged to rotate in a substantially vertical plane at an angle across the direction of travel of the apparatus, said discs mounted on said elongated rack by support members extending rearwardly and downwardly from said rack, to allow a clear space over and about a rearmost part of each said disc; and
   a substantially horizontal roller mounted at the rear of the frame behind said plurality of discs; whereby in use seeds can be poured through said apparatus onto said ground surface at or about the rearmost part of each said disc.

2. Apparatus as claimed in claim 1, wherein said shaft is movable so as to be raised or lowered relative to said frame.

3. Apparatus as claimed in claim 2, comprising a side wall projecting forwardly from both ends of said transverse plate.

4. Apparatus as claimed in claim 2, wherein said elongated rack is movable so as to permit said rack to be raised and lowered relative to said support frame; and said apparatus further comprises:
   rotatable engagement elements linking said rack to said support frame at or towards each end of said rack, said elements being coactively linked so as to all rotate at the same rate.

5. Apparatus as claimed in claim 4, wherein said rotatable discs are mounted in paired arrays, each disc of the pair being a substantial mirror image of the other, and wherein each said disc is dished and has a concave face and a convex face, with the concave face angled forwards in the direction of travel.

6. Apparatus as claimed in claim 5, wherein said rotatable engagement elements comprise sprockets mounted on said rack, arranged to climb rungs on said support frame, said sprockets being fixed on a common axle.

7. Apparatus as claimed in claim 6, wherein said rotatable engagement elements comprise gears mounted on said support frame, engaging shafts on said rack, said gears being operable by a common crankshaft.

8. Apparatus as claimed in claim 7, wherein said discs are approximately 8 inches in diameter and less than 4 inches apart.

9. Apparatus as claimed in claim 8, further including a seed hopper, extending at least partway across the width of the apparatus and having a plurality of outlets at intervals across the width of the apparatus, wherein a plurality of spouts are connected to said outlets with flexible ducts, and said spouts are mounted on a carriage which is movable relative to said rack.

10. Apparatus as claimed in claim 9, wherein said hopper includes an elongated horizontal door mounted across said outlets and movable over said outlets to open or close all of them simultaneously, and wherein said door is mounted on support means with rotatable engagement elements at or about each end of the door, said elements being coactively connected so as to all rotate at the same rate.

11. Apparatus as claimed in claim 10, comprising a side wall projecting forwardly from both ends of said transverse plate.

* * * * *